Nov. 29, 1938.   F. J. PLYM ET AL   2,138,508
BOW CONSTRUCTION FOR AN AUTOMOBILE ROOF
Filed March 20, 1936
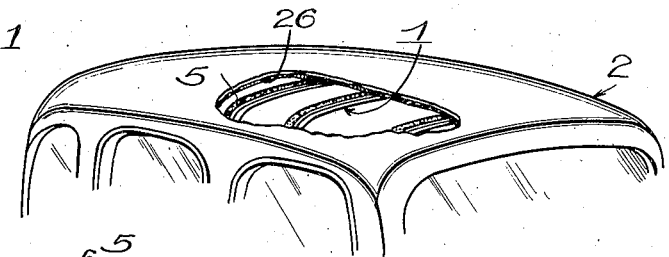
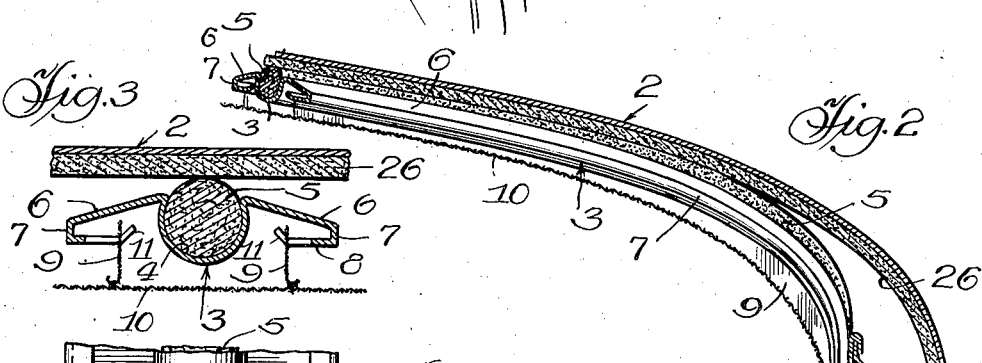
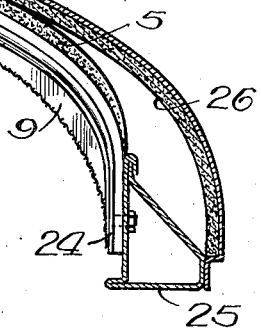
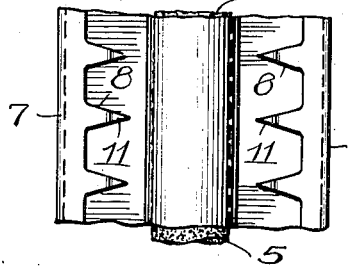
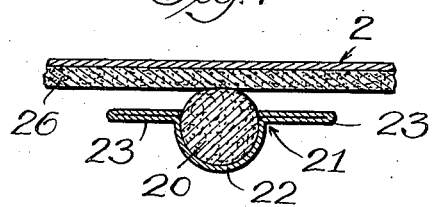
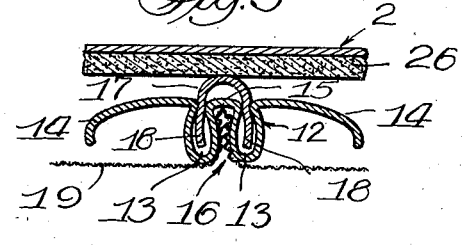
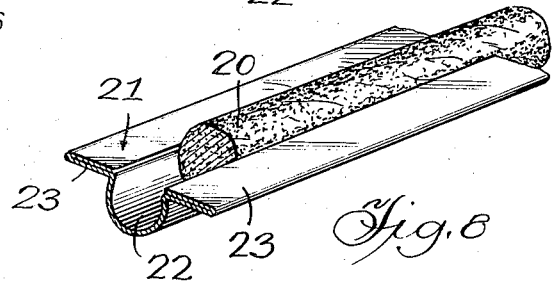
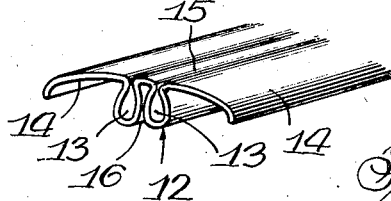
Witness:
Chas. L. Koursh.
Inventors
Francis J. Plym,
and Joseph G. Hoffer,
Parkinson & Lane. Attys.

Patented Nov. 29, 1938

2,138,508

UNITED STATES PATENT OFFICE 2,138,508

BOW CONSTRUCTION FOR AN AUTOMOBILE ROOF

Francis J. Plym and Joseph G. Hoffer, Niles, Mich., assignors to The Kawneer Company, Niles, Mich., a corporation of Michigan Application March 20, 1936, Serial No. 69,911

3 Claims. (Cl. 296—118)

The present invention relates to a roof construction for an automobile or other vehicle or conveyance, and more particularly to a bow section for supporting and insulating a metal roof or top of an automobile.

Among the objects of the present invention is the provision of a roof bow for supporting the roof or top of an automobile or other conveyance.

A further object of the invention is to provide a bow construction for supporting the roof or top of an automobile and having an insulating spacer or filler whereby the bow does not contact with the metal or material of the roof or top.

Another object of the present invention is the provision of a bow construction forming a combined support and means for insulating the bow from the top or roof of the automobile. In the preferred embodiment, the bow is so formed or constructed as to receive and retain a strip or roll of insulating material such as paper or the like.

A still further object of the invention is the construction of a bow adapted to transversely span the body of an automobile or other conveyance for supporting the roof or top, and provided with spacing means for separating the base or under-side of the roof and the metal of the bow.

Another object of the invention is the provision of a support for the roof or top of an automobile provided with means for anchoring and retaining the interior trim.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while I have shown therein a preferred embodiment, it is to be understood that the same is susceptible of modification and change, and comprehends other details, arrangements of parts, features and constructions without departing from the spirit of the invention.

In the drawing:

Fig. 1 is a fragmentary view in perspective of the roof or top of an automobile.

Fig. 2 is a fragmentary view, part in side elevation and part in perspective, of a novel form of bow construction.

Fig. 3 is a view in vertical cross section through the bow construction.

Fig. 4 is a fragmentary view of the bottom of the bow.

Fig. 5 is a view similar to Fig. 3, but showing an alternate form of bow construction.

Fig. 6 is a fragmentary view in perspective of the metal bow in Fig. 5.

Fig. 7 is a view similar to Figs. 3 and 5 showing a further alternate form of bow construction.

Fig. 8 is a fragmentary view in perspective of the bow construction disclosed in Fig. 7.

Referring more particularly to the construction shown in Figs. 1 to 4 inclusive, the bow construction 1 is shown as mounted in the top or roof 2 of an automobile. A plurality of these structures are mounted transverse of the automobile body for supporting the roof or top, and each comprise a bow 3 provided with a central depression, groove or channel 4 for receiving a filler or spacer 5, and downwardly and outwardly extending flanges 6 bent or turned rearwardly at 7 and thereat formed with inwardly projecting and suitably spaced apart prongs or legs 8.

The insert or spacer 5 is preferably formed of paper or the like, although it may be of any other suitable insulating material or fabric adapted to be pressed or forcibly inserted into the depression 4 and retained therein by reason of the contour or configuration of the depression as shown in Fig. 3. This filler extends above the metal bow and forms the contact between the bow and under-surface of the roof.

The prongs or legs 8 are adapted to hold strips 9 of any suitable material sewed or otherwise attached to the interior trim 10 of the body of the automobile and adapted to sustain or support this trim. In order to more readily and permanently retain these strips in position, the ends 11 of these prongs or legs are bent upwardly as more clearly shown in Fig. 3.

Figs. 5 and 6 disclose an alternate form of bow construction in which the metal bow 12 is bent to form spaced upwardly opening channels 13, and outwardly and downwardly projecting flanges 14. Intermediate the channels is formed a rib 15 of greater cross section at its upper part, while the channels or grooves are of less width at their opening. By reason of this conformation, the underside of the bow is formed with a downwardly opening channel or groove 16, the base of which is of greater width than the mouth or opening. In this construction the spacer or filler 17 is substantially U-shaped and the legs or projections 18 thereof are forced into the channels or grooves 13 and retained by the metal forming the walls of the grooves at their openings.

The interior trim 19 of the automobile is held anchored by the metal forming the walls of groove or channel 16 at its opening, when the trim is forced into this channel as shown in Fig. 5, thus making it a simple matter to trim or upholster the interior top of the car.

In Figs. 7 and 8 is disclosed a further alternate construction in which the filler or spacer 20 may be similar in contour to that shown in Figs. 1 to 4 inclusive, while the bow 21 is formed with a similar depression 22 to receive this member and the sides are merely doubled over to provide outwardly projecting flanges 23. In this form, no provision is made for anchoring an interior trim, although of course, means may be provided if a trim is desired. However, this construction is admirably adapted for use in trucks, buses and the like, where no trim is desired or required.

In these various forms, the ends 24 of the bows are connected to the body and such mounting is accomplished by bolting, welding, or riveting these ends to the roof rail 25, to which the roof is connected. Also in each of the forms, the under-surface of the roof is shown as provided with a coating or covering 26 which is preferably of some insulating or sound dampening material. Thus by reason of the present invention, a double insulation and dampening is provided, eliminating all possibility of a metal-to-metal contact and friction between the bow support and roof structure during their relative movement or displacement.

Having thus described the invention, we claim:

1. A metal bow for supporting the roof of an automobile or other vehicle, comprising a member adapted to span the top of the vehicle and formed to provide a longitudinally extending groove for retaining an insulating medium and outwardly and downwardly extending flanges having their outer ends bent inwardly, and means on the outer ends for anchoring the interior trim of the body to the bow.

2. A bow construction for supporting the roof of an automobile or other vehicle, comprising a metal bow adapted to span the body of the vehicle and provided with a channel so formed and arranged as to receive and anchor an insulating medium therein, and outwardly and downwardly projecting flanges at the opposite sides of the channel having their outer ends bent inwardly to provide anchoring prongs for sustaining the interior trim of the automobile.

3. In a bow construction for the metal top of an automobile or other conveyance, comprising a member adapted to bridge the top of the vehicle and provided with oppositely projecting flanges, a longitudinal channel in the upper part of said member, an insulating insert in said channel and projecting above the top surface of the bow so as to engage the under-surface of the roof and prevent contact between the metal of the bow and of the roof and form an insulation between the same, and spaced projections on the underside of the flanges for sustaining the interior trim for the top of the vehicle.

FRANCIS J. PLYM.
JOSEPH G. HOFFER.